Figure 1:
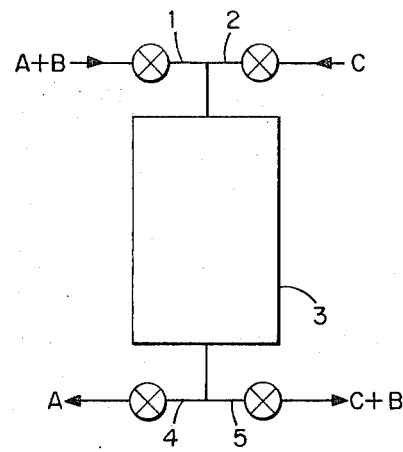

United States Patent [19]
Teller

[11] 3,859,417
[45] Jan. 7, 1975

[54] SELECTIVE CHROMATOGRAPHIC SEPARATION
[75] Inventor: Aaron J. Teller, Great Neck, N.Y.
[73] Assignee: Teller Environmental Systems, Inc., Worcester, Mass.
[22] Filed: June 25, 1971
[21] Appl. No.: 156,952

Related U.S. Application Data
[63] Continuation of Ser. No. 860,665, Sept. 24, 1969, abandoned, which is a continuation-in-part of Ser. No. 667,801, Sept. 14, 1967, abandoned, which is a continuation-in-part of Ser. No. 363,403, April 29, 1964, abandoned.

[52] U.S. Cl................. 423/244, 423/219, 423/230, 423/236, 423/239, 423/240, 423/245, 423/247
[51] Int. Cl............................................ B01d 53/34
[58] Field of Search......................... 23/2, 3, 150; 252/477

[56] References Cited
UNITED STATES PATENTS
| | | | |
|---|---|---|---|
| 1,091,325 | 3/1914 | Friedrich | 423/578 |
| 1,642,535 | 9/1927 | Blumenberg | 423/578 |
| 2,992,884 | 7/1961 | Bienstock et al. | 423/244 |
| 3,369,866 | 2/1968 | Sporman et al. | 423/578 |
| 3,544,263 | 12/1970 | Ninomiya et al. | 423/244 |

Primary Examiner—G. O. Peters
Attorney, Agent, or Firm—Thompson, Birch, Gauthier & Samuels

[57] ABSTRACT

This invention comprises a method for the separation of one component or more from a vapor or gas mixture which involves the step of reacting the component to form a complex or thermally decomposible molecule by reaction with a compound adsorbed or otherwise deposited on a solid carrier. Typical of the gas components that can be so removed, and recovered if desired are carbon dioxide, oxygen, nitrogen oxide, carbon monoxide, sulfur dioxide, silicon tetrafluoride, hydrogen sulfide, aromatic hydrocarbons, mercaptans, HCN, HF, HCl, $BF_3$ and HBr. Compounds which are adsorbed on the solid carrier for reaction with these various components include various carbonates, such as K, Na, Li, Ca, Cd, Ba; various sulfites, such as K, Na, Li, Cd and Ag; fluorides, glyoximes, ferrous and cupric salts, cuprous amine complexes, dioxane, urea, phosphates, chlorinated aromatics, organic nitriles, benzaldehyde, quinols, etc. The reactive compound is deposited on the solid carrier in a molecular film having a thickness of ½ to 5 molecules, which molecular layer has particular effectiveness for the purpose of this invention as described herein. The reaction is conducted at temperatures safely below the temperature at which the respective thermally-decomposible molecule is decomposed, and the original compound is subsequently regenerated and the gas component recovered by heating this product molecule above its decomposition temperature.

5 Claims, 2 Drawing Figures

SELECTIVE CHROMATOGRAPHIC SEPARATION

This application is a continuation of application Ser. No. 860,665, filed Sept. 24, 1969, now abandoned, which is a continuation-in-part of copending application Ser. No. 667,801, filed Sept. 14, 1967, and now abandoned, which in turn is a continuation-in-part of application Ser. No. 363,403, filed Apr. 29, 1964, now abandoned.

This invention relates to a method for separation of one or more components from a vapor mixture. More specifically, it relates to a vapor phase separation of one or more desired components from a mixture by means of selective reaction of said component or components. Still more specifically, it relates to a chromatographic separation of said components by selective chemical reaction of said component with a chemical compound deposited on a solid carrier.

Separation of a component from a mixture containing the same is generally achieved in chromatographic separations on the basis of variations in physical properties such as volatility, polarity, molecular size, steric phenomena, etc. Where separations are conducted by absorption into the liquid phase, the rate of separation is controlled by the diffusion rate of the component or of a reagent through the liquid phase. The separation method of this invention has the advantage over liquid phase separation methods in that the rate of separation is not controlled or hindered by the necessity of having either component or reagent diffused through a liquid.

While some vapor phase chromatographic separations by adsorption or absorption have been applied to analytical techniques, these techniques have required very high dilution in order to achieve separation. The high dilution is necessary for effective stratification of the solute inasmuch as the separation factors are reflective only of variations in physical properties which are the determinative factors in separation by adsorption or absorption. Therefore, such methods of separation are not applicable industrially where such dilutions are prohibitive to economical processing.

The process of this invention has the selectivity of separation dependent on chemical reaction which effects a much higher degree of efficiency of removal and a much more pure recovery of the desired component. In contrast, vapor recovery or separation by an adsorption or absorption system does not have the sharp selectivity of a chemical reaction and consequently cannot effect as high a degree of removal and cannot remove the desired component without also absorbing or adsorbing substantial amounts of undesired components. Moreover, the rate of removal by absorption accompanied by chemical reaction is extremely slow resulting from the necessity of reagent diffusion through the liquid phase. Consequently, the desired component is not recovered in either as efficient or as fast or as pure a manner by adsorption or absorption as compared with the present process.

The separation process of this invention can be effected without dilution, and with more rapid separation than in any other known separation process. Moreover, the process has the advantage that the separated solute is recoverable in essentially pure form.

The selective chromatographic separation process of this invention is based on the reaction of a solute gas with a reagent capable of forming an easily decomposible compound or complex, hereinafter sometimes generically referred to as "complex" (either an adsorbed liquid or a normally solid compound adsorbed in a liquid state) which has been deposited on a solid material having high surface characteristics. The formed complex is thermally reversible and the complexed-solute gas is recovered from the complex in essentially pure form by effecting a temperature rise in the system.

While certain of the chemical reactions used in the separations of this invention have been effected in the liquid phase by absorption or reaction after the component has been diffused through the liquid, the particular vapor phase separation of this invention has not previously been effected. The process of this invention has an advantage over liquid absorption or molecular sieve methods in the unique selectivity of the removal or separation process and the very high rate or speed of removal. In addition, much greater use of the reactive component is achieved than in conventional absorption processes. While the particular reagent or complex-former deposited on the surface carrier will vary according to the component to be separated as capable of reacting only with the single solute or group of solutes desired to be removed from the gas or vapor stream.

The adsorbed complex-forming compound is used to a maximum efficiency since it is spread on the surface of the carrier. Preferably it is in a monomolecular or bimolecular layer. Statistical layer thickness can range from 1/2 to 5 moles deep on the surface of the carrier. In addition to this thinness of the compound layer speeding up the reaction since there is no need for diffusion before reaction proceeds, this thinness of layer gives maximum free energy from the surface of the carrier and maximizes the surface of the complex-former.

In the practice of this invention, dilution of the inlet gas stream is unnecessary since the process is capable of effecting removal from a wide range of concentrations. Furthermore, diffusion in the gas phase is very rapid and turbulence is unnecessary to effect diffusion. Since the rate of reaction of the vapor component with the deposited compound on the substrate surface is rapid and the rate of diffusion is likewise rapid, the overall separating reaction is rapid, resulting in a situation where the wave front tends to be vertical, thereby permitting full use of the deposited reagent or complex-forming material. For example, the rate of transfer, represented by $K_Ga$, which is pound-mols/cu.ft. $\times$ hr. $\times$ atmospheres, has been measured to be in the range of 100–600 according to the practice of this invention, whereas the comparable absorption process indicates the $K_Ga$ to range between 0.5 and 4.

The process of this invention can be operated with the reagent-supporting particles in a fixed bed, moving bed or fluidized system. The various conditions and means for effecting contact of the vapor with the deposited reagent are those normally used for gas-solid particle contacting systems.

Typical compounds or reagents capable of forming complexes or thermally decomposible molecules include the following: glyoximes, such as dimethyl glyoxime, etc.; various sulfites, such as potassium, sodium, lithium, cadmium and silver sulfites; various carbonates, such as potassium, sodium, lithium, calcium, cadmium, and barium carbonates; various ferrous, cupric and manganous salts, such as ferrous nitrate, ferrous sulfate, ferrous chloride, cupric nitrate, cupric chloride, cupric sulfate, manfanous nitrate, etc.; cuprous amine complexes, such as cuprous ammonium chloride, cuprous ammonium nitrate, cuprous ammonium bromide, etc.; various phenolic compounds, such as phenol, hydroquinone, naphthol, pyrgallol, orcinol, phloroglucinol, 3-Quinol-M,dioxane, urea, tripotassium phosphate, quinones, such as o-naphthoquinone, tetrachloro-o-benzyl quinone, phosphine oxides, such as trimethyl phosphine oxide, triethyl phosphine oxide, tripropyl phosphine oxide, etc.; aldehydes, such as benzaldehyde, naphthaldehyde, etc.; organic nitriles such as acetonitrile, propionitrile, butyronitrile, acrylonitrile, benzonitrile, etc.; nicotinic acid, etc.

Typical solute gases or vapors that can be recovered and preferred complexing compounds used for a particular vapor are as follows:

| Oxygen | Nicotinic acid, dimethyl glyoxime. |
|---|---|
| Carbon Dioxide | $K_2CO_3$, $Na_2CO_3$, $Li_2CO_3$, $CaCO_3$, $CdCO_3$, and $BaCO_3$. |
| Nitrogen Oxides | Ferrous and cupric salts, such as ferrous nitrate, ferrous sulfate, ferrous chloride, etc., cupric nitrate, cupric chloride, cupric sulfate, manganese nitrate, etc. |
| Carbon Monoxide | Cuprous amine complexes. |
| Silicon Tetrafluoride | Dioxane, KF and NaF. |
| Hydrogen Sulfide | Hydroquinone, $\beta$-Quinol, 3-Quinol-M, etc. |
| Aromatic Hydrocarbons (Benzene, Toluene, Xylene) | Urea. |
| Mercaptans (Methyl, Propyl and Ethyl) | Tripotassium phosphate. |
| Sulfur Dioxide | Sulfites, such as $K_2SO_3$, $Na_2SO_3$, $Li_2SO_3$, $CdSO_3$ and $Ag_2SO_3$; phenols such as phenol, naphthol, hydroquinone, pyrgallol, etc.; quinones, such as o-naphthoquino, tetrachoro-o-benzoquinone, etc. |
| Hydrogen Fluoride | Dioxane, KF and NaF. |
| Hydrogen Chloride | Chlorinated diphenyl, hydroquinone,$\beta$-quinol, etc. |
| Boron Trifluoride | Benzaldehyde, organic nitriles, such as acetonitrile, propionitrile, butyronitrile, acrylonitrile, benzonitrile, etc. |
| Hydrogen Bromide | Orcinol, phloroglucinol, $\beta$-quinol, etc. |
| Hydrogen Cyanide | Chorinated aromatic hydrocarbons, such as chlorinated diphenyl, etc.; boron tribromide, 3-quinol-M, etc. |

The complex-formers or complexing reagents which are deposited on the support material can be described generically as compounds capable of forming a loosely bonded molecule which is thermally decomposible. Such compounds have an element therein having a free electron in an outer orbit or mobile electrons in an inner orbit. Such a compound is tetrachloro-orthobenzoquinone. The attraction of the ring electrons by the chlorine atoms results in coordinate complexes being developed with $SO_2$. This resultant complex if thermally decomposible. Others may form acid salts with the solute (with or without water vapor) that are thermally unstable.

Various sulfites and carbonates form bisulfites and bicarbonates which are easily decomposed thereby regenerating the reacted gas component, by heating the reaction product to an appropriate temperature. For example, sulfur dioxide is easily and effectively reacted at temperatures in the range of 110°F. to 170°F. with $K_2SO_3$, $Na_2SO_3$, $Li_2SO_3$, $CdSO_3$ and $Ag_2SO_3$. The reaction is promoted by the presence of water vapor in the feed gas and the bisulfite is decomposed to regenerate the sulfite and the $SO_2$ by heating to a temperature in the range of 250°F. to 400°F. These reactions are represented schematically as follows:

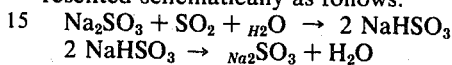

$$Na_2SO_3 + SO_2 + {}_{H_2}O \rightarrow 2\ NaHSO_3$$
$$2\ NaHSO_3 \rightarrow {}_{Na_2}SO_3 + H_2O$$

Likewise carbon dioxide is easily reacted at temperatures of 90°–180°F. with molecular layers of $K_2CO_3$, $Na_2CO_3$, $Li_2CO_3$, $CaCO_3$, $CdCO_3$ and $BACO_3$ to give the corresponding bicarbonates. The bicarbonates can subsequently be decomposed to regenerate the starting carbonate and to recover the carbon dioxide by heating at 200°–350°F. These reactions are schematically represented as follows:

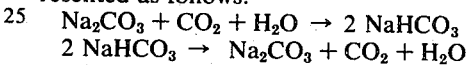

$$Na_2CO_3 + CO_2 + H_2O \rightarrow 2\ NaHCO_3$$
$$2\ NaHCO_3 \rightarrow Na_2CO_3 + CO_2 + H_2O$$

It is possible by the process of this invention to make selective separations and recovery of various gas components from a particular gas mixture. For example, it is possible to pass the particular gas mixture through a series of absorptive beds, each bed containing a particular compound suitable for removing a particular component from the gas mixture. Subsequently each bed can be heated to the appropriate decomposition temperature for removing the particular gas component reacted in that bed. It is also possible where there are differences in the respective decomposition temperatures for various reaction products of different components of a gas mixture, to have the appropriate compounds deposited on the same or different carriers in the same bed, and after the gas mixture has been passed through the bed for reaction of the various components of the gas, the gas component given off by the lowest decomposition temperature is first removed. Then the gas component regenerated by the next higher decomposition temperature is thereafter removed, etc.

For the purpose of this application, the "breakthrough" point is generally regarded as that point at which the effluent from the reaction cycle starts to have more than 10 parts per million of the desired component. While the system is operating satisfactorily for the removal of the desired components from the gas stream the effluent generally has less than 10 parts per million. When the effluent reaches a content of 10 parts per million of the desired component, this means that the system has reached the saturation point for this component and very shortly the effluent will rise very sharply in its content of this component.

FIG. 1 represents schematically a system using a fixed bed of substrate having the solid reagent deposited thereon. At the top, inlet lines 1 and 2 are shown with inlet 1 for the stream of carrier gas A containing solute gas B. As this gas stream passes through the bed in Chamber 3 solute gas B reacts with the deposited component on the substrate to form the complex which retains component B in the bed and allows carrier gas A to flow out the exit line 4 at the bottom of the chamber. During the recovery cycle, this gas stream line 1 and the corresponding outlet are shut off and the steam or other condensible gas C, or a non-condensible carrier or a purge of the pure solute gas is fed through inlet tube 2 into the fixed bed thereby heating the complex to the decomposition point and releasing component B so that it flows out exit line 5. In the case of recovery with the steam or condensible carrier gas C, separation by cooling to condense the steam or other condensible may be used and thereby allow recovery of the gas component B. Condensation of the solute with purge solute gas may also be used, or the stripped solute gas and non-condensible carrier may be recycled.

Regeneration may also be accomplished by indirect heating of the bed and exhausting the pure solute B by vacuum pumping, or a combination of both methods may be used.

Figure 2:
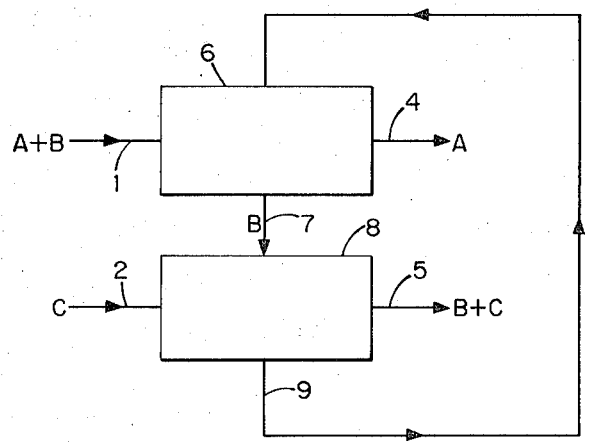

In the moving bed or fluidized bed system arrangement shown in FIG. 2, the carrier gas A containing solute gas B is fed through inlet line 1 into chamber 6 containing the solid substrate on which the reactive component is deposited. As the solute gas component B reacts with the reagent and becomes complexed therewith, carrier gas A flows though the exit line 4 at the right of chamber 6. The moving bed or fluidized bed passing from chamber 6 through the connecting line 7 into chamber 8 carries with it component B in the complexed form. In chamber 8 steam or other heated condensible carrier gas C is admitted by inlet line 2 into contact with the complex or the system is heated indirectly with or without combination of carrier gas flow. Upon reaching the decomposition temperature the complex releases gas component B which thereafter flows out the exit 5 at the right of the chamber in a gas stream containing B and C or it is evacuated. Gas component or solute B is recovered by cooling the gas stream to condense the carrier gas C. The moving or fluidized regenerated substrate passing out exit line 9 from chamber 8 is then recycled to chamber 6 where it is put into contact again with the carrier gas A containing solute gas B and then the cycle is repeated.

The reference above to the solid materials having high surface characteristics means that the actual length and area are much greater than the length and area of the solid particles. Generally the actual surface area is at least 500, preferably at least 1,000 times the superficial area. Many materials of these surface charactertistics are available, such as finely divided alumina, activated carbon, diatomaceous earth, baked clay, granulated brick, silica gel, "Teflon" (polyfluorethylene), sodium chloride, "Celite,"talc, zeolites, etc.

The fact that the extended surface is a function of the discontinuities in the surface structure is illustrated as follows:

No Discontinuity          Discontinuity

←AB→                      —AB—

The superficial length may be the same, but the actual length and, therefore, surface are quite different.

Taking one gram of alumina at 100-120 mesh fraction with an average linear dimension of 0.13 mm per particle, the bulk density of alumina is 1 gm/cc, but the density of the solid alumina is 4 gm/cc. Therefore one gram of solid occupies a true volume (no air space) of 0.25 cc.

The volume of 1 particle is $2.18 \times 10^{-6}$ cm$^3$
Number of particles/gram is $0.25/2.18 \times 10^{-6} = 1.146 \times 10^5$
Area per particle is $1.01 \times 10^{-3}$ cm$^2$
Total superficial area per gram of particles is
$(1.146 \times 10^5 \times 1.01 \times 10^{-3})/10^6 = 0.001155$ m$^2$/gm The extended surface material has a true area of 1,000 to 1,000,000 times the superficial area.

Reference to molecular depth means the statistical average. Since it is very unlikely that there will be equal and even deposition, the molecular depth is given as the statistical average. Therefore we can have depositions representing fractions of molecules. The molecular depth is based on the number of molecules times their statistical area divided by the extended surface available.

Activated alumina has an area in the range of 100-300 m$^2$/gm. A typical alumina is indicated in Straus, Industrial Gas Cleaning, Table 3.7, p. 108, Pergamon Press (1966) where an activated alumina is shown with a surface area of 175 m$^2$/gm, a pore volume of 0.39 cm$^3$/gm and a mean pore diameter of 90 A.

On the basis that 1 cm$^3$ of alumina has a bulk density of approximately 1.2 gm/cc, the mass is 1.2 gm and the area of the extended surface is 210 m$^2$. With a 10 A. molecule of CaCO$_3$ the maximum area of coverage of a surface is based on a square 10 A. on each of the sides. The area is therefore the product of the dimensions of 2 sides. Since 1 A. = $1 \times 10^{-10}$ m, the maximum area per molecule is $10^{-10} \times 10^{-10}$ or $10^{-20}$ m$^2$. Therefore a 1 cm cube of alumina that has an area of 210 m$^2$ can contain on the basis of 1molecular thickness, $2.1 \times 10^{22}$ molecules of CaCO$_3$. This is equivalent to $(2.1 \times 10^{22})/(6.02 \times 10^{23}) = 0.035$ mols or 3.5 gms. of CaCO$_3$.

Inasmuch as the pore size distribution limits the availability of effective surface adsorption of CaCO$_3$ to those pores having diameters in the range of 100 A and greater, and inasmuch as those sites often represent only 1 to 10 percent of the available area, then the weight of CaCO$_3$ for a one molecular thickness represents a weight of CaCO$_3$ ranging from 0.035 to 0.35 gms. This range for the one molecule thick unit for this specific activated alumina represents a range of 2.9 to 29 gms. per 100 gms. of carrier. It has been our experience in a range of carriers that the 2 to 25 parts per 100 parts of carrier can provide the desired thickness range of 0.5 to 5 molecules.

The statements related to the thickness of the layers in molecules is reflective of a statistical average based on the surface area, pore size distribution of the surface area, thus limiting the deposition zone, and the substrate molecular size. Thus it is possible to establish statistically even fractional depth deposition.

When deposition depths exceed this range then activity diminishes to the level of conventional absorption. The fact that in this range the mass transfer coefficient increases 100–1,000 fold over that of conventional absorption processes using the same materials is indicative of the critical range for this unanticipated effect.

For example, in a study of the use of amines via mono to termolecular depths, in concentrated depositions on a carrier such as in the Haensel U.S. Pat. No. 2,818,323 and in liquid phase contacts, the mass transfer coefficients at 10% depletion of the reagent are:

|  | $K_ca$ |
|---|---|
| Mono to Termolecular Deposition | 400–600 |
| Gross Deposition (Haensel) | 5–15 |
| Liquid Phase | 3–10 |

However, the use of amine is undesirable in this process from an economic viewpoint inasmuch as it tends to evaporate during the regeneration period.

With respect to the Al U.S. Pat. No. 1,831,731 which shows the deposition of alkali carbonate on low surface pumice having an area in the range of 4 m²/gm, even though the concentration is at the higher limit established in the present application, the deposition thickness will be much greater than established in applicant's limits. Therefore, the rate of absorption will be significantly lower. This is the critical difference in the processes — the present process is rapid, the others are slow.

The invention is best illustrated by the following examples. It is not intended that these examples limit in any way the scope of the invention or the manner in which it can be practiced. Unless otherwise specified, parts and percentages are given in parts by weight and percentages by weight respectively.

EXAMPLE I

A substrate is prepared by dissolving 10 parts of $K_2SO_3$ (generally in the form of $K_2SO_3.2H_2O$) in 50 parts of water. Then 100 parts of 8–14 mesh alumina is added with stirring. Because of the absorption of the water by the alumina the product is in the form of dry particles with the $K_2SO_3$ deposited in a molecular layer on the surface of the alumina. This chromatographic material is placed in a column equipped with a feed gas inlet at one end and a gas outlet at the opposite end. A flue gas (or simulated flue gas) at a temperature of 110°F. and containing 3,500 ppm of $SO_2$ is passed through this bed at a rate of 1 foot per second (calculated on the basis of standard temperature and pressure). The $SO_2$ content of the exit gas is measured periodically, and when the concentration of the exit gas reaches 2 ppm, the gas flow is terminated and the bed regenerated by heating at 250°–400° F. until no more $SO_2$ is given off. It is found that in these particular tests the breakthrough becomes evident at about 19 minutes and that the ultimate capacity of the bed is 0.95 mols $SO_2$/Mol $K_2SO_3$. In repeating the above procedure with various gases containing different amounts of $SO_2$, it is found that the process operates very efficiently with gases containing 500–20,000 ppm of $SO_2$.

The foregoing procedure is repeated with excellent results by replacing the $K_2SO_3$ with equivalent amounts of $Na_2SO_3$, $Li_2SO_3$, $CdSO_3$ and $Ag_2SO_3$ respectively. Variations of the foregoing procedures show that the desirable concentration of substrate is 2–20 parts per 100 parts of solid carrier and that the absorptive capacity is 0.6–1 mols of $SO_2$ per mol of substrate. Moreover, repetition of these procedures with different solid carriers also shows that activated carbon, diatomaceous earth and baked clay can likewise be used satisfactorily.

EXAMPLE II

The procedure of Example I is repeated using in place of the $K_2SO_3$ an equivalent amount of the following carbonates respectively: $K_2CO_3$, $Na_2CO_3$, $CaCO_3$, $CdCO_3$ and $BaCO_3$, and using an absorption temperature of 90°–180°F. and a regeneration or decomposition temperature of 200°–350°F. It is found that a desirable concentration of substrate is 2–25 parts per 100 parts of solid carrier, and that the absorption capacity is 0.5–1 mol of $CO_2$ per mole of substrate. Upon repetition of the foregoing procedure with different supporting solids, it is found that activated carbon, diatomaceous earth and baked clay can also be used satisfactorily.

EXAMPLE III

A substrate comprising 8–14 mesh alumina is prepared by depositing thereon an amount of tetrachloro-ortho-benzoquinone equal to 4 percent of the support weight. The deposition is achieved by adsorption of a solution of the tetrachloro-ortho-benzoquinone in benzene by the alumina.

A stream of flue gas containing 3,000 ppm of sulfur dioxide is passed through a bed (1 foot long) of the material at a rate of 1.2 feet per second. The system temperature is maintained between 120°F. and 130°F.

At the time of break-through the capacity of the bed is 3.5 mols sulfur dioxide per mole of tetrachloro-o-benzoquinone. Regeneration of the sulfur dioxide is achieved by purging the system with sulfur dioxide at 240°F. The residual free volume $SO_2$ is removed by a plug flow air purge into the raw gas feed for the next cycle.

EXAMPLE IV

The procedure of Example III is repeated using 15 percent by weight ferrous nitrate deposited on activated carbon from a water solution, an absorption temperature of 25° C., a gas flow period of 17 minutes, and a regeneration temperature of 60°C. Nitric oxide is effectively removed from an air stream containing 0.5 percent nitric oxide with an effluent stream of 1 ppm. The procedure of this example is likewise effective when the active component is ferrous sulfate. Similar results are obtained when gas streams are used containing various percentages of other nitrogen oxides such as nitrogen dioxide and nitrogen tetroxide.

EXAMPLE V

The procedure of Example IV is repeated effectively for the removal of carbon monoxide from a gas stream comprising approximately 1 percent carbon monoxide in nitrogen and carbon dioxide. The reactive component in this case is cuprous ammonium chloride on diatomaceous earth. Similar results are obtained when cuprous ammonium bromide is substituted as the active reagent deposited on the support.

EXAMPLE VI

Silicon tetrafluoride is effectively recovered from air containing 30–100 mg/cu.ft. of this material by using the procedure of Example IV, but substituting dioxane as the deposited component on the activated carbon.

EXAMPLE VII

By repeating the procedure of Example IV, hydrogen sulfide is effectively recovered from an air stream containing 0.3–3 percent of $H_2S$. Similar results are obtained when hydroquinone is used in place of the active component used in Example IV.

EXAMPLE VIII

Hydrogen fluoride is recovered effectively from a gas stream containing 5,000 ppm of HF by using the procedure of Example III with sodium fluoride deposited as the reagent on activated carbon.

EXAMPLE IX

Ethyl mercaptan is recovered from a gas stream containing 0.1–0.4 percent of the mercaptan in air by using the procedure of Example IV with tripotassium phosphate as the reagent deposited on the support. When vapor streams are used containing propyl mercaptan, methyl mercaptan and butyl mercaptan, respectively, similar effective results are obtained.

EXAMPLE X

Hydrogen cyanide is recovered from an air stream containing 5 percent hydrogen cyanide using the procedure of Example IV except that tetrachlorodiphenyl is the complex-former deposited on the chromosorb, the absorption temperature is about 90°F. (32° C.) and the desorption temperature is about 150°F. (65°C.). The exhaust gas has less than one part per million of HCN therein.

As indicated above the thermally decomposible bisulfites and bicarbonates are reconverted to the sulfites and carbonates respectively by heating in the range of 250°–400° F. for the bisulfites and in the range of 200–350°F. for the bicarbonates. The sulfur dioxide and the carbon dioxide respectively are regenerated by such heating.

It is generally satisfactory for desorption purposes with true complexes to raise the temperature at least 20°C., preferably 30°–60°C. above the maximum temperature at which absorption occurs. As a general rule, absorption is effected in the range of 40°C. to 200°C., preferably 20°–80°C. with the desorption temperature being increased at least 20° C., preferably at least 30°–100°C. over the maximum absorption temperature.

In place of the various supporting means used in the above examples, various other supporting materials can be used on which to deposit the reagent or complex forming component. These include: granulated brick, alumina, activated carbon, silica gel, "Teflon," sodium chloride, "Celite," talc, zeolites, diatomaceous earths, etc. For example, satisfactory results are obtained when the procedure of Example IV is repeated using the foregoing materials respectively in place of activated carbon.

Likewise, other regenerating or recovery gases can be used in place of the steam. These can vary according to the particular system and advantageously are easily condensible vapors which are not reactive with the solute gas component. Indirect heating can also be used in combination with the regenerating gases with resultant smaller quantities of elution gas required or indirect heating can be used in combination with a vacuum placed on the system for recovery of pure solute gas.

One of the surprising aspects of this invention is the fact that even though the deposited or adsorbed complexforming reagent is believed to be in the liquid state, there is no liquid film or liquid phase resistance or delay in diffusion or reaction of the gas component with the reagent. This is reflected in the high value obtained for $K_Ga$ and indicates that the reagent is deposited in a mono-molecular or bimolecular film.

While certain features of this invention have been described in detail with respect to the various embodiments thereof, it will, of course, be apparent that other modifications can be made within the spirit and scope of this invention and it is not intended to limit the invention to the exact details shown above except insofar as they are defined in the following claims:

The invention claimed is:

1. A process for the vapor phase chromatographic separation of sulfur dioxide from a gaseous mixture which contains, in part, water vapor and sulfur dioxide comprising the steps of:
   a. passing said gaseous mixture at a temperature of 110°–170°F into contact with an absorbent, high surface area solid support material having deposited thereon a compound capable of reacting chemically with sulfur dioxide to form a thermally decomposible molecule, said compound being selected from the group consisting of $K_2SO_3$, $Na_2So_3$, $Li_2SO_3$, $CdSO_3$ and $Ag_2SO_3$; and ,
   b. removing said gaseous mixture, substantially free of $SO_2$, from contact with the support material and the thermally decomposible molecule.

2. The process of claim 1 wherein said compound is regenerated for reuse by raising the temperature of said support material and the thermally decomposible molecule deposited thereon to a temperature above the decomposition temperature of said molecule until substantially all of the sulfur dioxide is driven off and recovered.

3. The process of claim 2 wherein the temperature is raised to between 250° and 400°F for regeneration.

4. The process of claim 1 wherein said compound is deposited on said absorbent solid support material by the steps of:
   a. dissolving the compound in water to form a solution; and,
   b. gradually stirring into said solution the absorbent solid support material until substantially all of said solution has been absorbed.

5. The process of claim 4 wherein said solution comprises 10 parts by weight of $K_2SO_3$ in 50 parts water and said absorbent solid support material comprises 100 parts of 8–14 mesh alumina.

* * * * *

UNITED STATES PATENT OFFICE
CERTIFICATE OF CORRECTION

Patent No. 3,859,417  Dated January 7, 1975

Inventor(s) Aaron J. Teller

It is certified that error appears in the above-identified patent and that said Letters Patent are hereby corrected as shown below:

Column 2, line 21 - after "separated" insert -- from the vapor mixture, this reagent or component is selected --.

Column 3, line 67 - "if" should be -- is --.

Column 4, line 15 - "$_{H2}O$" should be -- $H_2O$ --;

line 16 - $_{Na2SO3}$" should be -- $Na_2SO_3$ --;

line 19 - "$BACO_3$" should be -- $BaCO_3$ --;

line 29 - "sonehts" should be -- ponents --.

Column 5, line 5 - "tube" should be -- line --.

Column 8, line 4 - "absorption" should be -- absorptive --.

Signed and sealed this 13th day of May 1975.

(SEAL)
Attest:

RUTH C. MASON
Attesting Officer

C. MARSHALL DANN
Commissioner of Patents
and Trademarks